United States Patent [19]

Inglis

[11] 4,051,535
[45] Sept. 27, 1977

[54] MAGNIFICATION OF TELEVISION IMAGES

[76] Inventor: James M. Inglis, 24 Cotton Ave., Braintree, Mass. 02184

[21] Appl. No.: 675,603

[22] Filed: Apr. 9, 1976

[51] Int. Cl.² .............................................. H04N 5/72
[52] U.S. Cl. .................................. 358/231; 358/237; 358/250; 358/255
[58] Field of Search ............... 358/231, 237, 250, 255

[56] References Cited

U.S. PATENT DOCUMENTS

| 2,590,130 | 3/1952 | Schlesinger | 358/237 |
| 3,560,649 | 2/1971 | Anderson | 358/231 |
| 3,632,873 | 1/1972 | Henkin | 358/250 |
| 3,800,085 | 3/1974 | Ambats | 358/237 |
| 3,814,509 | 6/1974 | Miano | 358/237 |
| 3,909,523 | 9/1975 | Bartucci | 358/237 |

*Primary Examiner*—Richard Murray
*Assistant Examiner*—Edward L. Coles
*Attorney, Agent, or Firm*—Wolf, Greenfield & Sacks

[57] ABSTRACT

A compact, economical system for magnifying a television image. A fresnel lens of focal length up to 10 inches projects an image from a television image source onto a rear projection screen. Lens aberrations and light quality are controlled by an opaque enclosure which fits around the lens, extends toward the screen, and terminates at a variable aperture. A means is provided for intercepting nearly all light from the television source that is directed toward the screen but does not pass through the lens. The system may be adjusted to be compatible with any conventional television set.

10 Claims, 5 Drawing Figures

MAGNIFICATION OF TELEVISION IMAGES

BACKGROUND OF THE INVENTION

The invention in general relates to the magnification of television images and more particularly concerns a novel system that is both compact and economical and projects an enlarged television image for lifelike viewing. The image produced by the system may be viewed in a lighted room.

A system that produces a large, lifelike television image that can be viewed in a lighted room has obvious important commercial advantages, and therefore has been a subject of much experimentation and research. Most commercial television image magnification systems have been forward projection systems. Any simple magnification system using an optical lens will produce an inverted and reversed image. Reinversion of the image may be accomplished by turning the image source, i.e. the television set, upside down. However, in forward projection systems the re-reversal of the image cannot be accomplished except by an electronic means or complex mirror or lens system all of which are relatively expensive. The present invention solves the inversion-reversal problem by inverting the television image and using rear projection which results in an image in the normal plane when viewed from the front of the screen. Previous rear projection image magnification devices have employed relatively expensive light intensification methods such as multiple television sources or photosensitive screens. Thus up to the present time all systems that have produced lifesize viewable television images have required large room size projection areas and/or have been priced out of the range of the average television viewer.

Accordingly it is an object of this invention to provide a system for magnifying television images that overcomes one or more disadvantages of conventional television image magnification systems.

It is an important object of this invention to achieve the preceding object with a system that is relatively economical.

It is another object of this invention to achieve one or more of the preceding objects in a system that requires relatively little room space.

It is another object of this invention to achieve one or more of the preceding objects in a system that can be viewed in a lighted room.

It is a further object of this invention to achieve one or more of the preceding objects in a system that can be used in combination with any conventional television set.

It is still another object of this invention to achieve one or more of the preceding objects in a system that can be adjusted to maximize desirable magnified image characteristics.

It is another object of this invention to achieve one or more of the preceding objects in a system that can provide lifelike visual and audio projection.

It is yet another object of this invention to achieve one or more of the preceding objects in a system that is simple to operate and maintain.

SUMMARY OF THE INVENTION

According to the invention there is a fresnel lens of focal length up to 10 inches, an enclosure fitting all around the circumference of the lens and extending in a direction parallel to the optical axis of the lens, and the means defining an aperture in the end of the enclosure. There is a means for intercepting light arranged in combination with the lens so that if a television image source is placed on the side of the lens opposite to the direction in which said enclosure extends, substantially along the optical axis of the lens, and within 18 inches of the lens, substantially all the light emitted from the source and not passing through the lens will be intercepted. Preferably there is a means for varying the size of the aperture, and a means for adjustably suspending the lens, the means for intercepting, the enclosure, and the aperture. Preferably the means for intercepting comprises a plate of opaque material formed with a central opening. The enclosure preferably comprises an open ended box which is secured to the plate so that it circumscribes the central opening, and the means defining an aperture comprises a sheet of opaque material formed with a rectangular opening, which sheet fits over the end of the box away from the lens. Preferably the means for adjustably suspending comprises an adjustable arm, one end of which is secured to the plate and the other end of which is adapted to attach to a television set. Preferably the means for varying the size of the aperture comprises a set of opaque cards, each card formed with a central opening of a different size, and a three-sided frame attached to the aperture sheet along a raised rim having a height substantially equal to the thickness of the cards so that when one of the cards is inserted between the frame and the aperture sheet and is seated against the rim, the opening in the card is centered over the opening in the aperture sheet. Alternatively the means for intercepting comprises an opaque frustum of a rectangular pyramid the larger end of which is adapted to fit around a television image source and the smaller end of which fits around and supports the lens and the box-like enclosure. Preferably the magnifying system is suspended in front of a television image source so that it projects the image onto a rear projection screen.

Numerous other features, objects and advantages of the invention will now become apparent from the following detailed description when read in conjunction with the accompanying drawing, in which:

DETAILED DESCRIPTION OF THE PREFERRED EMBODIMENT

Figure 1:
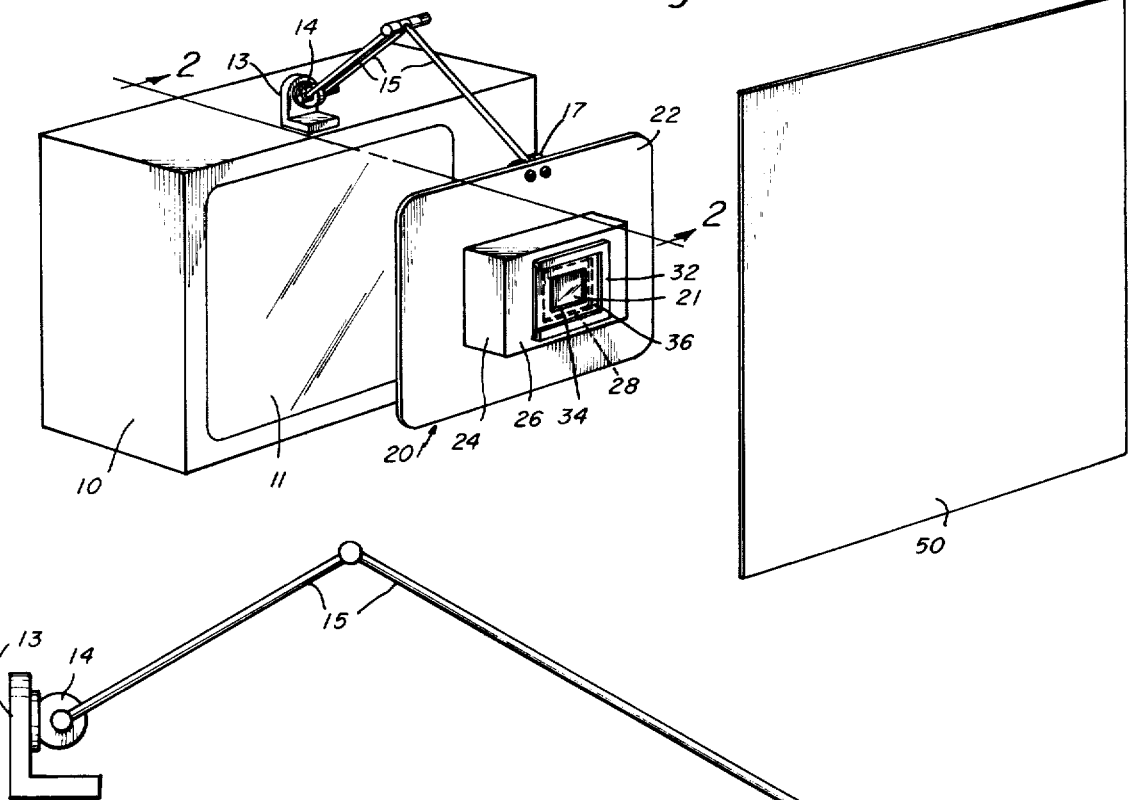
FIG. 1 is a pictorial illustration of the preferred embodiment of the invention which is adjustable to fit any conventional television image source.

With reference now to the drawing and more particularly FIG. 1 thereof, there is shown a pictorial illustration of the preferred embodiment of the invention which is adjustable to fit any conventional television image source. An image produced by upside down television set 10 is projected by magnification system 20 onto the rear of projection screen 50 thereby producing an enlarged image viewable in the normal orientation from the front of the screen.

Figure 2:
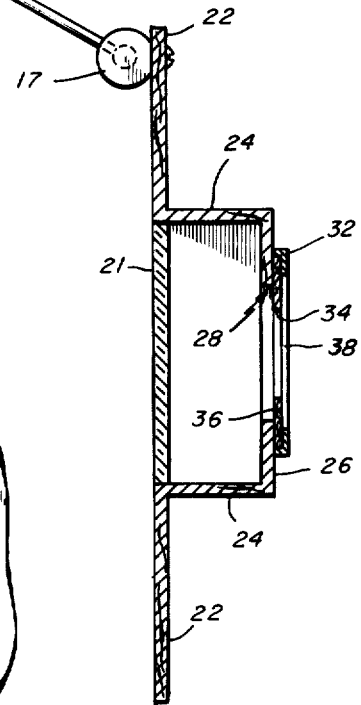
FIG. 2 is a cross sectional view of the embodiment of the invention shown in FIG. 1 taken through line 2—2 of FIG. 1.

Referring now to FIG. 2 there is shown a cross sectional view of the preferred embodiment of the invention taken through line 2—2 of FIG. 1. Fresnel lens 21 is located in the center opening of plate 22 with its optical axis perpendicular to the plate and has a focal length up to 10 inches. Preferably the focal length is 8½ inches although lenses with focal lengths as short as 2⅝ inches have been used with excellent results. The short focal length is important because it permits the rear projection screen to be placed very close (i.e. from a few inches to a few feet) in front of the television screen. Larger focal lengths require the rear projection screen to be placed at larger distances (e.g. three feet or more) from the television screen. Therefore in a normally lighted room it is very likely that a source of room light will come between the television image source and the rear projection screen. Room light sources in such a position are very destructive to the magnified image quality unless means for amplifying the light intensity of the source are provided. Typically the lens may be constructed of clear plastics, such as acetate butyrate, or glass with refracting facets molded in one side of the lens by precision molding techniques. Such lenses are commercially available through suppliers such as Edmund Scientific Company of Barrington, N.J. Typical dimensions of the lens may be 5 inches by 7 inches by 1/16 inch.

Plate 22 intercepts substantially all the light that is emitted from television screen 11 that does not pass through lens 21. The limit on the amount of light that may escape plate 22 is determined by the fact that any such light that reaches rear projection screen 50 will tend to wash out the magnified image; depending on the discrimination of the viewer a greater or lesser amount of such magnified image degradation is tolerable. A practical limit to the size of plate 22 can be determined by the requirement that no light that travels in a direct, straight path from television screen 11 (and does not pass through the lens) should be permitted to strike the rear of the projection screen 50 (in contradistinction to light from television screen 11 that may reflect off the walls and ceiling of the room and strike the rear of projection screen 50). If the light traveling directly from screen 11 to screen 50 is not intercepted, a very noticeable deterioration of image quality around the edges of screen 50 where such light impinges will occur.

Plate 22 should be of such a size that it will intercept all light as described above from a conventional television source placed approximately as shown, i.e. on the side of lens 21 opposite to the direction in wich enclosure 24 extends, substantially along the optical axis of lens 21 (i.e. along a line perpendicular to the plane of lens 21 and passing through its center), and within 18 inches of the lens. Substantially along the optical axis means that the television set 10 need not be right on the optical axis but simply should be placed as close to the axis as the average viewer can place it by visual alignment. Placing the set on the optical axis makes the most efficient use of the magnifying system but the adjustment is not critical. The limit on the distance from lens 21 that television set 10 may be placed is determined from the same criteria as the limit on the size of the focal length as discussed above. Generally the distance from lens 21 that screen 50 must be placed is roughly equal to the distance between screen 11 and lens 21 times the magnification desired. Thus if a magnified image twice the size of the television image is desired and screen 11 is one foot from lens 21 then screen 50 must be placed 2 feet from lens 21 which yields a total distance between screen 11 and screen 50 of 3 feet. At this point one is approaching the limit where in the average room a substantial amount of light will impinge on the back of screen 50. Considering the lighting in an average room, about 18 inches is the practical limit that one would desire to place television screen 11 from lens 21.

Opaque enclosure 24, fits all around the circumference of the lens and extends away from the lens in the direction of the screen. As shown, enclosure 24 is preferably an open ended box. It functions to prevent light from spurious sources (i.e. from sources other than the television image) form striking the lens and reflecting back toward screen 50. It should be clear that the enclosure need not be completely closed or completely opaque in all circumstances; indeed small amounts of light may enter the enclosure, strike the lens, reflect back onto the screen and reduce the image quality only slightly. However, in order to produce maximum image quality under the wide variety of conditions that may be present in a viewing area, preferably enclosure 24 is complete enclosed (except for the openings for lens 21 and aperture 28) and opaque as shown.

Aperture sheet 26 fits over the end of enclosure 24 and defines rectangular opening 28 which defines the maximum size of the aperture. Preferably the aperture size may be varied by inserting card 36 between the frame 32 and sheet 26 through the open end of the frame so that the aperture size is determined by opening 34. As shown, frame 32 is three sided and is secured to sheet 26 along its circumference by a raised rim which has a height substantially equal to the thickness of card 36; the relative height of the rim to the thickness of the card is determined by the requirements that the card should slide easily in the slot formed by the frame, therefore the rim height cannot be less than the card thickness, however the rim height should not be so much greater than the card thickness that the card fits so loosely in frame 32 that opening 34 does not align properly with opening 28 or light is allowed to pass around its periphery. A set of such aperture cards is provided, each card with a different size opening. As shown the opening 34 is rectangular and is centrally located in card 36. Frame 32 is symmetrically located around opening 28 so that when card 36 seats against end 38 of the frame (the end opposite the open side) opening 34 is centrally located over opening 28. The aperture effectively reduces the distortion caused by lens aberrations. Most of the distortion is due to rays of light that strike the lens off the optical axis. The aperture is sized and placed so as to provide minimum distortion with maximum use of the lens. Preferably the distance between lens 21 and aperture 34 is between 20% and 50% of the focal length of the lens and the aperture area is between 25% and 50% of the lens area. With a lens of focal length 8½ inches, for example, the aperture may be about 3¾ inches square and is placed approximately 2 inches in front of the lens. Preferably frame 32, card 36, sheet 26, box-like enclosure 24, and plate 22 are composed of wood painted black on the sides exposed to the light from the television image. Alternatively they may be composed of lightweight material such as cardboard or other materials if desired.

Returning now to FIG. 1, magnification system 20 is shown suspended in front of television image source 10 by adjustable arm 15 one end of which is attached to plate 22 by pivot 17 and the other end of which is attached to television image source 10 through pivot 14 and flange 13.

Rear projection screen 50 is preferably an elastic vinyl-type fabric made of light-spreading transparent microcells and is commercially available from distributors such as Edmund Scientific Company of Barrington, N.J. under the trade name "Lenscreen". It is possible, however, to use other screens such as treated plexiglass, green glass rear projection screening, and other semi-translucent materials, although the latter may function at a lower efficiency.

It should be noted that in FIG. 1 the relative distances between television set 10, magnification system 20 and screen 50 are somewhat distorted in order to make the various elements clear in the drawing. In practice the elements are much closer than they appear to be in the drawing. For example, when a fresnel lens of $2\frac{1}{8}$ inches focal length is used, plate 22 is placed against the front of television set 10 and rear projection screen 50 is approximately 6 inches in front of television screen 11.

An important feature of the invention is that the entire system comprising television image source 10, the magnification system 20 and the screen 50 need not be placed in a light tight box in order to obtain bright rear projected images. Several parts of the invention work in combination to produce this effect. Plate 22 intercepts most if not all of the light from the TV image that is directed toward screen 50 that does not pass through lens 21. Aperture 34 and enclosure 24 eliminate spurious relections and most of the off-axis aberrations of the lens. Projection screen 50 transmits most of the light incident upon its rear to the forward part of the screen. In addition light incident upon the forward portion of the screen creates only slight fading in the rear projected image. As discussed above, the short focal length of the lens permits screen 50 to be placed very close to television set 10 so that when the entire system is placed in a normal viewing position, for example in the corner of a room, very little room light is incident on the rear portion of the screen. If in addition the system is placed in the darkest part of the room or care is taken to reduce back scatter from the walls behind television set 10, then an even brighter image is achieved.

Figure 3:
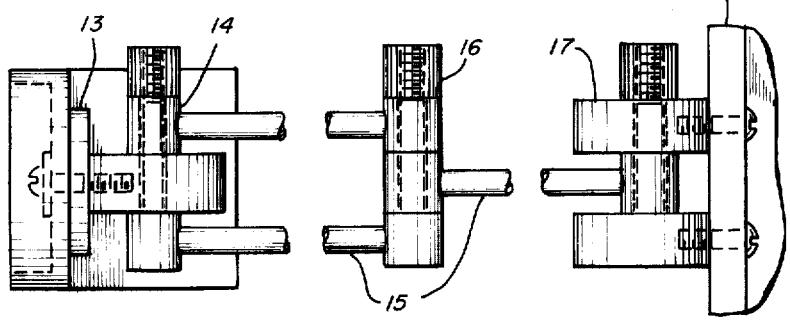
FIG. 3 is a detailed diagrammatic illustration of an exemplary embodiment of the adjustable supporting arm.

Another feature of the invention is that it provides great flexibility with a minimum of expense and moving parts. Arm 15 shown in detail in FIG. 3 pivots at points 14, 16, and 17 and therefore permits the system to be adjusted to fit any conventional TV set. The precise form of the adjustable arm is not essential to the invention; a sliding type arm or any other variety of adjustable support may be used. In addition, as discussed above, in the preferred embodiment the size of the aperture can be easily adjusted by changing card 36 to yield the optimum image characteristics for any combination of television source image size, television screen to lens and lens to rear projection screen distances, and desired magnified image size. It should be noted that any other means of varying the aperture size, such as an iris diaphragm, may be used without departing from the concept of the invention.

Another feature of the invention is that in the normal viewing position soundwaves traveling from television set 10 are directed onto projection screen 50 presenting an illusion that the sound is actually issuing from the images themselves, which increases the viewing pleasure. In addition the light spreading properties of the vinyl screen give a sense of depth to the image and eliminates the raster lines that are present in all television screens. Both these effects enhance the life-like apparance of the image.

Figure 4:
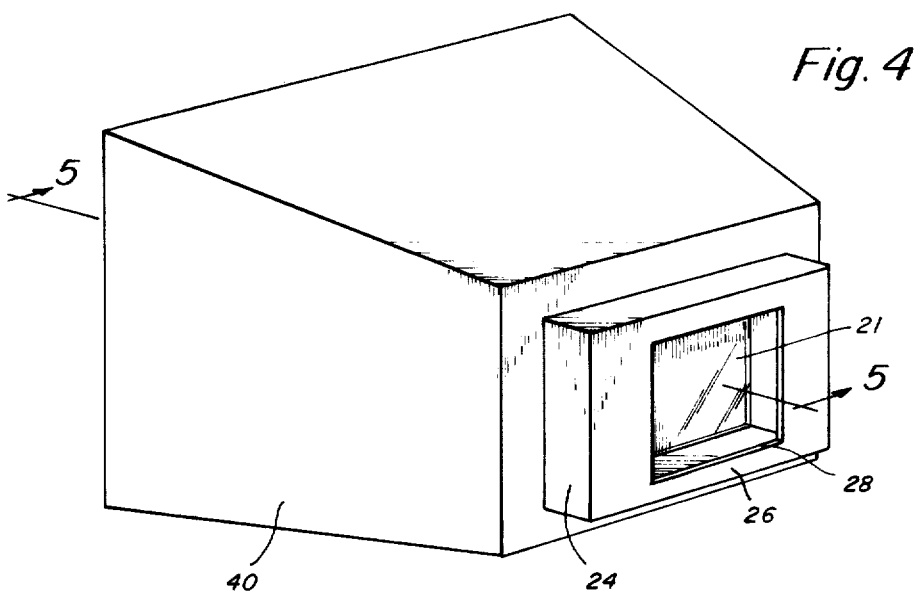
FIG. 4 is a pictorial illustration of an alternative embodiment of the invention.
Figure 5:
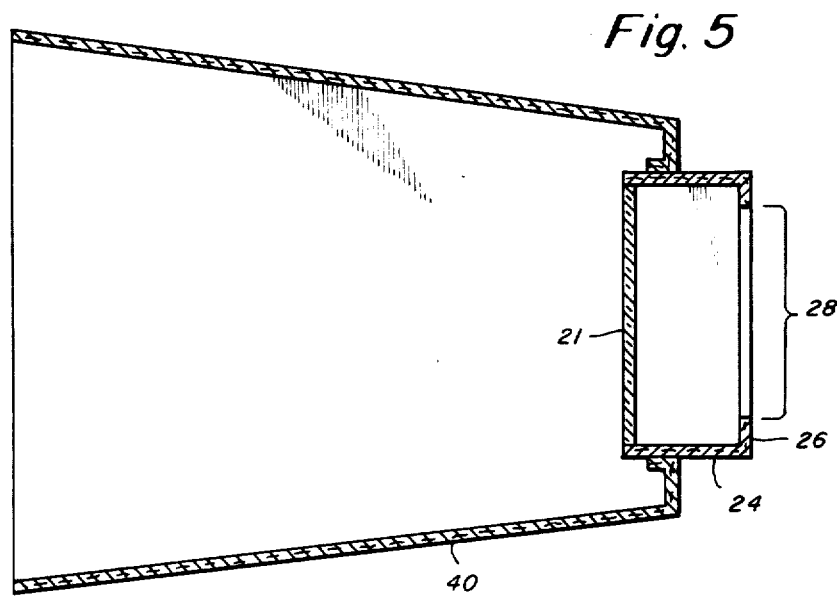
FIG. 5 is a cross sectional view of the alternative embodiment of the invention shown in FIG. 4 taken through line 5—5.

Referring now to FIG. 4 there is shown a pictorial illustration of an alternative embodiment of the invention. In this embodiment the means for intercepting the light from the television image that is directed toward the screen but does not pass through the lens comprises an opaque frustum of a rectangular pyramid 40, the larger end of which fits around television screen 11 and the smaller end of which fits around and supports box-like enclosure 24 and lens 21. Preferably frustum 40 is composed of heavy cardboard painted black on the inside and finished on the outside to present a pleasant appearance; however, a larger variety of other materials may be used. FIG. 5 shows a cross sectional view of this alternative embodiment taken through line 5—5 of FIG. 4. Box-like enclosure 24 fits around the circumference of lens 21, extends away from the lens, and is covered by aperture sheet 26 defining aperture 28, as in the embodiment of the invention described previously. Although it is not shown here, it is clear that a variable aperture as described above may be incorporated with this embodiment also.

Both the embodiments of the invention illustrate the simplicity, durability, and compactness of the invention. There are a minimum of parts that are movable and thus susceptible to breakage. The preferred vinyl screen is elastic and flexible, and folds and rolls with no creases. It will resist fire and fungus, is non-yellowing, unaffected by temperature of humidity, and may be cleaned with soap and water. All these characteristics in turn contribute to an important feature of the invention, the fact that it can be produced at a relatively low cost. The alternative embodiment described above, for example, may be marketed for as low as $20 per unit. This feature makes the system feasible for use by the individual television viewer.

There has been described a novel system for magnifying a television image that projects an enlarged television image for lifelike viewing, is economical, and has numerous other features. It is evident that those skilled in the art may now make numerous uses and modifications of and departures from the specific embodiments described herein without departing from the inventive concepts. For example, while rectangular lenses are preferred for element 21, in some cases round or other configurations of lenses may be used. The geometric configuration of enclosure 24, or light intercepting elements 22 and 40 may vary greatly. Many other possibilities of modifying the invention have been discussed above. Consequently the invention is to be construed as embracing each and every novel feature and novel combination of features present in or possessed by the apparatus herein disclosed.

What is claimed is:

1. A system for magnifying a television image comprising:
    a fresnel lens of focal length up to 10 inches,
    an enclosure fitting all around the circumference of said lens and extending in a direction parallel to the optical axis of the lens,
    a means defining an aperture in the end of said enclosure away from said lens,
    a means for intercepting light arranged in combination with said lens so that if a television image source is placed on the side of the lens opposite to the direction in which said enclosure extends, substantially along the optical axis of the lens and within 18 inches of the lens, substantially all light emitted from said source and not passing through said lens will be intercepted, the distance between said lens and said aperture being between 20% and 50% of said focal length, and the area of said aperture being between 25% and 50% of the area of said lens.

2. A system for magnifying a television image in accordance with claim 1 and further comprising a means for varying the size of said aperture.

3. A system for magnifying a television image in accordance with claim 1 and further comprising a means for adjustably suspending said lens, said means for intercepting, said enclosure, and said aperture.

4. A system for magnifying a television image in accordance with claim 3 wherein:

said means for intercepting comprises a plate of opaque material formed with a central opening, said enclosure comprises an open ended box of opaque material secured to said plate so that it circumscribes said central opening, said means defining an aperture comprises a sheet of opaque material formed with a rectangular opening, said sheet fitting over the end of said box away from said lens, and said means for adjustably suspending comprises an adjustable arm one end of which is secured to said plate and the other end of which is adapted to attach to a television set.

5. A system for magnifying a television image in accordance with claim 4 and further comprising a means for varying the size of said aperture.

6. A system for magnifying a television image in accordance with claim 5 wherein said means for varying the size of said aperture comprises:

a set of opaque cards, each card formed with a central opening of a different size, and a three-sided frame attached to said sheet along a raised rim having a height substantially equal to the thickness of said cards so that when one of said cards is inserted between said frame and said sheet and is seated against said rim, the opening in said card is centered over the opening in said sheet.

7. A system for magnifying a television image in accordance with claim 1 wherein:

said fresnel lens has a focal length of 8¼ inches and an area of 35 square inches, and the distance between said lens and said aperture is substantially 2 inches.

8. A system for magnifying a television image in accordance with claim 1 wherein:

said enclosure comprises an open ended box, said means for intercepting comprises an opaque frustum of a rectangular pyramid the larger end of which is adapted to fit around a television image source and the smaller end of which fits around and supports said lens and said box-like enclosure, and said means defining an aperture comprises a sheet of opaque material formed with a rectangular opening, said sheet fitting over the end of said box away from said lens.

9. A system for magnifying a television image in accordance with claim 8 wherein:

said fresnel lens has a focal length of 8¼ inches and an area of 35 square inches, and the distance between said lens and said aperture is substantially 2 inches.

10. In a system for magnifying a television image of the type employing a source of an inverted television image and a rear projection screen, the improvement comprising:

a fresnel lens of focal length up to 10 inches located between said source and said screen so that it projects said image onto the screen, means for intercepting substantially all the light from said source which is directed toward said screen but does not pass through said lens, an enclosure fitting all around the circumference of said lens and extending forward toward said screen, means defining an aperture in the forward end of said enclosure, the distance between said lens and said aperture being between 20% and 50% of said focal length, and the area of said aperture being between 25% and 50% of the area of said lens.

* * * * *